United States Patent [19]

Brun

[11] Patent Number: 4,772,988

[45] Date of Patent: Sep. 20, 1988

[54] DIPPED HEADLIGHT PROVIDING AN OFFSET BRIGHT SPOT WITHOUT USING A MASK

[75] Inventor: Norbert Brun, Bobigny, France

[73] Assignee: Cibie Projecteurs, France

[21] Appl. No.: 53,252

[22] Filed: May 22, 1987

[30] Foreign Application Priority Data

May 26, 1986 [FR] France ........................ 86 07462

[51] Int. Cl.[4] ........................ B60Q 1/00; F21M 3/08

[52] U.S. Cl. ........................ 362/61; 362/297; 362/341; 362/346; 362/215

[58] Field of Search ........................ 362/215, 297, 341, 346, 362/347

[56] References Cited

U.S. PATENT DOCUMENTS

| | | | |
|---|---|---|---|
| 4,566,056 | 1/1986 | Kouchi et al. | 362/297 |
| 4,612,608 | 9/1986 | Peitz | 362/297 |

FOREIGN PATENT DOCUMENTS

| | | | |
|---|---|---|---|
| 1801304 | 5/1969 | Fed. Rep. of Germany | 362/297 |
| 2162625 | 2/1986 | United Kingdom | 362/297 |

*Primary Examiner*—Margaret A. Focarino

[57] ABSTRACT

A dipped headlight for a motor vehicle, comprises: a reflector (200) including two sectors (201, 202) in the form of paraboloids of revolution about a common axis, said sectors being disposed symmetrically about said axis and being delimited by two axial planes, one of which planes is horizontal and the other of which planes is at an angle to said horizontal plane equal to the lift angle ($\alpha$) of the dipped beam cutoff; an axial filament lamp upwardly offset in a radial direction from said axis; and a light-spreading glass placed in front of the reflector and having non-deflecting or substantially non-deflecting zones corresponding to said two sectors in the form of paraboloids of revolution; said headlight including the improvements whereby: said two sectors in the form of paraboloids of revolution have different focal lengths, with their focuses being situated on the axis and respectively ahead of and behind the center of the filament; and said reflector further includes reflecting surfaces (203, 204, 205, 206) extending beyond said axial planes and interconnecting, without discontinuity, said two paraboloidal sectors having different focuses, said reflecting surfaces reflecting images of the filament below said cutoff.

6 Claims, 4 Drawing Sheets

DIPPED HEADLIGHT PROVIDING AN OFFSET BRIGHT SPOT WITHOUT USING A MASK

The present invention relates to a motor vehicle headlight for producing a dipped beam.

BACKGROUND OF THE INVENTION

A dipped beam is characterized by a cutoff, i.e. a generally horizontal upper limit above which no light may be emitted. FIG. 1 of the accompanying drawings shows an example of a cutoff as projected onto a standard screen at a range of 25 meters (m). This specific cutoff is laid down by regulations in several countries, in particular in Europe. For traffic using the right-hand side of the road, this cutoff is constituted by a horizontal half-plane h'H extending leftwards from the horizontal longitudinal axis of the vehicle and by a half-plane Hc extending rightwards from the same axis and sloping slightly upwardly, typically at an angle $\alpha=15°$. Naturally, this configuration is inverted for traffic using the left-hand side of the road.

In addition to satisfying this cutoff in order to avoid dazzling drivers of vehicles coming the other way, a dipped headlight beam must satisfy various other requirements concerning light intensity at various points and regions below the cutoff. In particular, the "bright spot", i.e. the region of the illuminated field in which light concentration is at a maximum, must preferably be situated immediately beneath the cutoff and slightly to the right of the central vertical axis v'-v passing through the longitudinal midplane of the vehicle so as to illuminate the side of the road adequately. This concentration is determined, in particular, by measuring the light flux at test points called "75R" and "50R", which flux must be greater than a specified minimum allowable amount.

Conventional dipped headlights have a filament lamp, a reflector, a mask which defines the above-mentioned cutoff, and a spreading glass which closes the headlight, and it is common practice for the desired concentration of the beam as defined to be obtained by making the reflector and the glass with highly specific optical characteristics.

However, Cibie's published French patent application No. 2 536 502 of Nov. 19, 1982 describes a dipped headlight without a mask. More precisely, the above-defined "European" type of cutoff is obtained solely by virtue of special designs for the reflector and the glass. This headlight includes a reflector having two sectors in the form of paraboloids of revolution about a common axis, said sectors being disposed symmetrically about said axis and being delimited by two axial planes, one of which is horizontal and the other of which is at an angle to said horizontal plane equal to the lift angle $\alpha$ of the dipped beam cutoff. The headlight also has a lamp with an axial filament which is upwardly offset radially from said common axis, and a beam-spreading glass placed in front of the reflector, with the zones of the glass corresponding to said two paraboloidal sectors being arranged to deflect the beam to a small extent only. As described in said published patent application, the two paraboloidal sectors have a common focus situated axially beneath the center of the filament, and they have the same focal length.

The main advantage of such a headlight is a considerable increase in the delivered light flux by virtue of the mask being omitted.

However, the bright spot obtained with this headlight is essentially centered on the longitudinal axis of the vehicle, as can be seen in FIG. 2 of the accompanying drawings, which shows isocandela curves $C_i$ of the illumination produced by such a prior art headlight on a standardized screen at 25 meters (the shaded zone T). This position has two major drawbacks. Firstly, such a central bright spot is extremely sensitive to vertical oscillations of the vehicle. Thus, when the vehicle pitches, very marked differences appear in the illumination of the road ahead, thereby tiring the eyes of the driver. Secondly, in order to optimize the visibility distance given by a dipped headlight, the bright spot should be superposed over the point 75R as defined in the European regulations, i.e. said spot needs to be offset on the screen to the right and upwardly. In this respect, it is difficult, in practice, to offset said bright spot to the right and upwardly by means of deflecting prisms or the like in the headlight glass, since there is considerable degradation in the sharpness of the cutoff with the danger of too many light rays leaking upwardly and dazzling the drivers of oncoming vehicles. Inevitable small manufacturing defects in the molding of the closure glass thus have too great an effect on the final product.

The present invention seeks to improve the maskless dipped headlight in such a manner as to obtain a beam which is not only completely satisfactory as to its cutoff but which also has a bright spot which is properly offset to the right from the longitudinal central axis of the vehicle.

SUMMARY OF THE INVENTION

The present invention provides a dipped headlight for a motor vehicle, comprising:

a reflector including two sectors in the form of paraboloids of revolution about a common axis, said sectors being disposed symmetrically about said axis and being delimited by two axial planes, one of which planes is horizontal and the other of which planes is at an angle to said horizontal plane equal to the lift angle ($\alpha$) of the dipped beam cutoff;

an axial filament lamp upwardly offset in a radial direction from said axis; and a light-spreading glass placed in front of the reflector and having non-deflecting or substantially non-deflecting zones corresponding to said two sectors in the form of paraboloids of revolution;

said headlight including the improvements whereby:

said two sectors in the form of paraboloids of revolution have different focal lengths, with their focuses being situated on the axis and respectively ahead of and behind the center of the filament; and said reflector further includes reflecting surfaces extending beyond said axial planes and interconnecting, without discontinuity, said two paraboloidal sectors having different focuses, said reflecting surfaces forming images of the filament below said cutoff.

BRIEF DESCRIPTION OF THE DRAWINGS

An embodiment of the invention is described by way of example with reference to the accompanying drawings, in which:

FIGS. 1 and 2 are described above in the introduction to the present specification, and they are not described again.

DESCRIPTION OF PREFERRED EMBODIMENT

Figure 3:
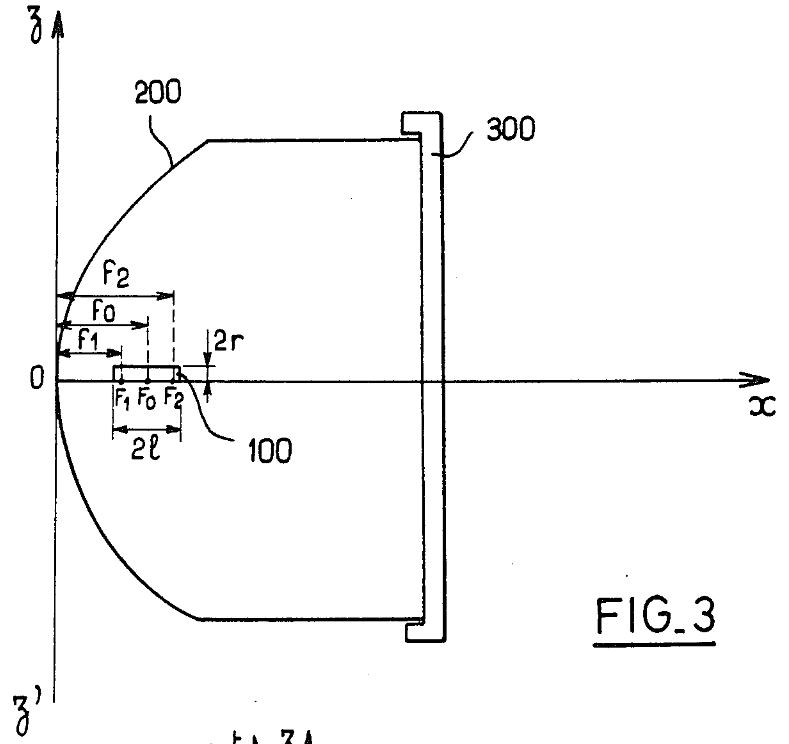
FIG. 3 is a diagrammatic longitudinal vertical section through a dipped headlight in accordance with the present invention.
Figure 4:
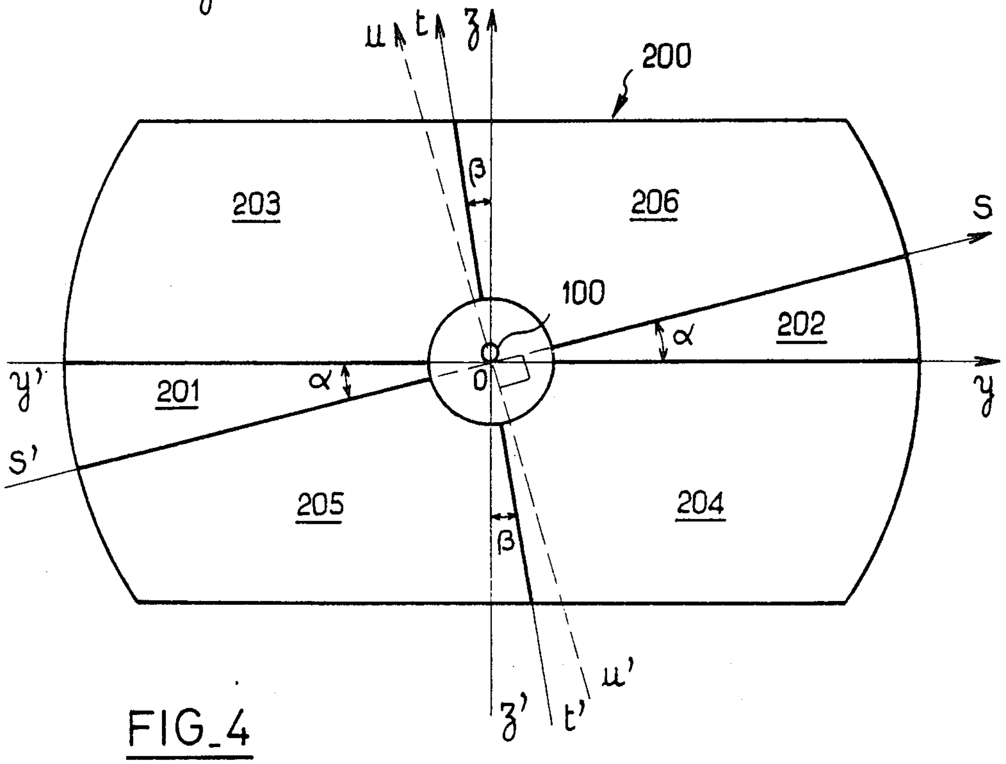
FIG. 4 is a view of the back of the reflector of the FIG. 3 headlight.

FIGS. 3 and 4 show a dipped headlight in accordance with a preferred embodiment of the invention.

The headlight includes a lamp having an axial filament 100, a reflector 200, and a spreading glass 300 which closes the front of the headlight.

Unlike a conventional headlight with a mask in which the filament is disposed in front of the focus of the parabolic reflector with the filament axis lying substantially on the optical axis of the reflector, the present headlight has a filament 100 (as represented by a cylinder of length $2l$ and of radius r) which is upwardly offset by a distance equal to its radius r from the optical axis Ox of the headlight. Thus, the light-emitting surface of the filament is essentially tangential to said axis Ox.

Figure 1:
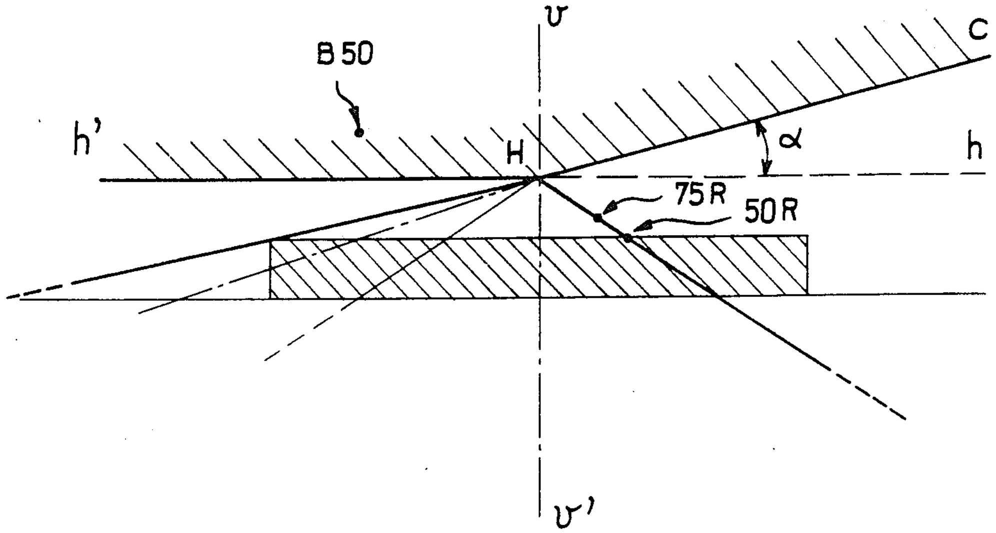
FIG. 1 is a diagrammatic front view of a standardized plane at 25 meters which is used for specifying the illumination to be provided by a dipped headlight.
Figure 2:
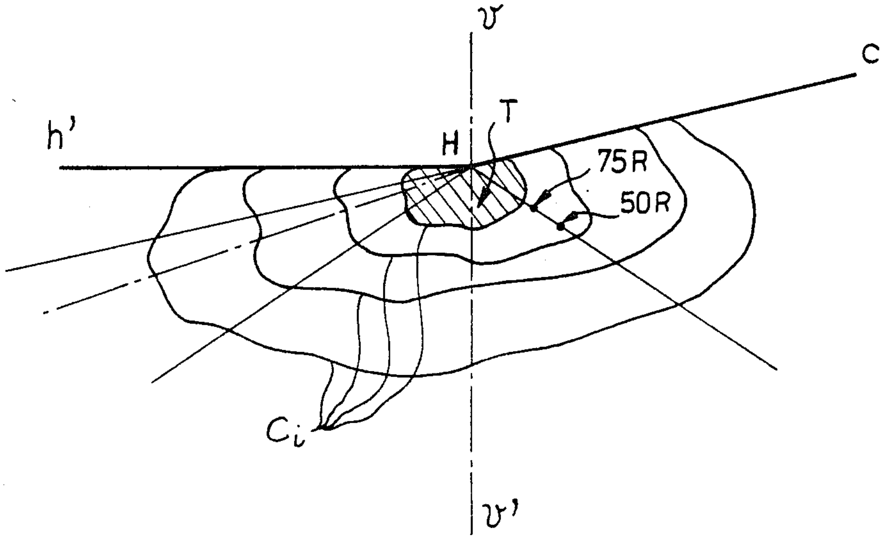
FIG.2 PRIOR ART
FIG. 2 is a plot of isocandela curves on the standardized plane at 25 meters as projected by a prior art dipped headlight without a mask.

The reflector or mirror 200 is subdivided into a plurality of sectors 201 to 206. These six sectors are separated by three axial planes, namely: the horizontal plane xOy; a plane xOs at an angle $\alpha$ to the plane xOy, where $\alpha$ is equal to the lift angle of the right-hand side of the dipped beam cutoff as shown in FIG. 1 (i.e. about 15 degrees); and a plane xOt, at an angle $\beta=\alpha/2$ to the vertical z'-z (i.e. about 7°30').

Two sectors 201 and 202 are defined between the planes xOy and xOs and both of them are paraboloid in shape. More precisely, the focus of the first parabolic sector 201 is referenced $F_1$ in FIGS. 3 and 5 and is situated close to the axially rear end of the filament. The focus $F_2$ of the second parabolic sector 202 is situated close to the other end of the filament. The corresponding focal lengths $f_1$ and $f_2$ are determined so that these focuses $F_1$ and $F_2$ are situated on either side of the center $F_0$ of the filament in the axial direction and at equal distances therefrom, as explained in greater detail below.

Figure 6:
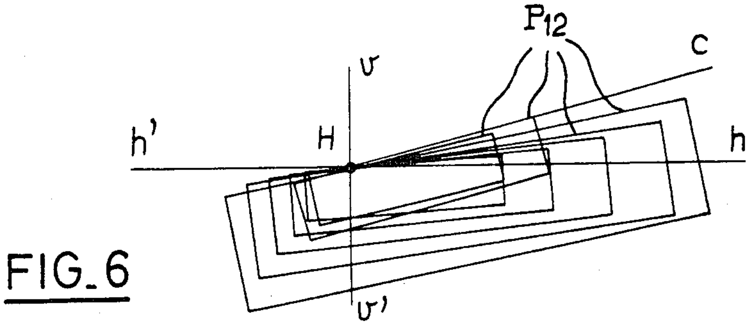
FIGS. 6 to 8 are front views of the images of the filament as reflected onto a standardized screen at 25 meters by three different zones of the reflector shown in FIGS. 3 and 4.
Figure 9:
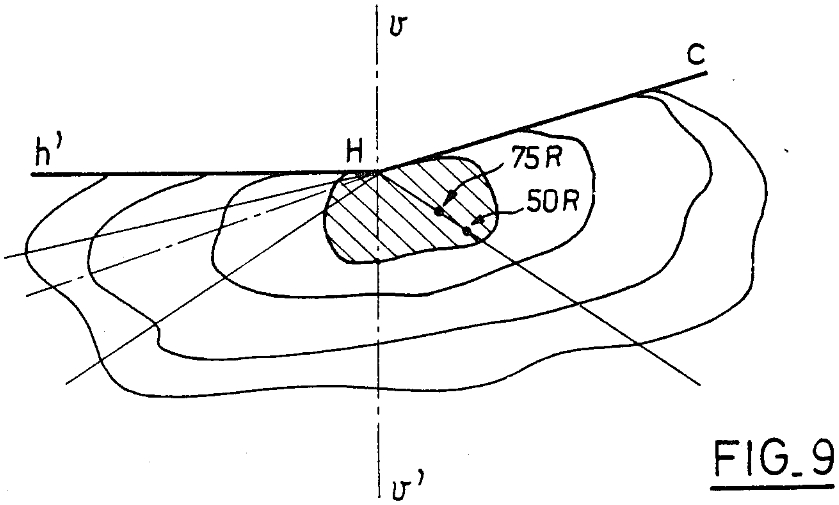
FIG. 9 is a plot of isocandela curves showing the illumination obtained from the headlight of FIGS. 4 and 5 on the standardized screen.

The images of the filament 100 as reflected by these two sectors onto the standardized screen at 25 meters appear as shown in FIG. 6. As can be seen, these images $P_{12}$ begin the cutoff h'Hc by being situated immediately therebelow, and they concentrate light in the region situated to the right or the central vertical reference v'v, thereby greatly facilitating the provision of adequate light flux at standard points 50R and 75R of the European regulations, i.e. the points where the minimum illumination required by the regulations is highest.

It may be observed here, that relative to the dipped headlight without a mask described in Cibie's above-mentioned French Pat. No. 2 536 502, the use of two focuses $F_1$ and $F_2$ disposed symmetrically about the center $F_0$ of the filament serves to offset the bright spot to the right while still retaining the advantage of doubling the light flux in the bright spot relative to the light flux that would be obtained from a conventional dipped headlight using a mask.

It may also be observed that since the images of the reflector zones 201 and 202 are suitably positioned to create a portion of the desired beam, both with respect to the bright spot and with respect to the sloping cutoff, there is no need to provide significant optical corrector elements on the closure glass 300 of the headlight in order to deflect the light rays. The zones of the glass which corresponds to the zones 201 and 202 are therefore non-deflecting or only slightly deflecting.

Starting from this basic configuration, the invention makes use of the other sectors 203 to 206 of the reflector firstly to reinforce the intensity of the beam and secondly to provide better definition of the cutoff h'H in the left-hand half plane. As shown in greater detail below, these sectors are designed so that the images they form of the filament all have their uppermost points situated on the cutoff h'Hc, or at least very close thereto.

In accordance with the present invention, these zones 203 to 206 are constituted by deflector surfaces which provide transitions between the different-focus paraboloid-shaped sectors 201 and 202 by going respectively round the top half and round the bottom half of the reflector. These transitions are smooth in that they exhibit second order continuity.

It is recalled that second order continuity of a surface is obtained when the tangent planes on either side of any point along any line drawn on the surface are the same. In practice, this means that there are no breaks in the surface. Thus, in practice, it is possible to obtain real surfaces which are very close to the theoretical design surfaces described below so that optical defects are not observed.

In purely mathematical terms, the invention may be implemented using the following equations.

The paraboloidal zones 201 and 202 having different focuses satisfy the equation:

$$x=y^2/4f_h+z^2/4f_h \quad (1)$$

where $$f_h=f_0+(y/|y|)(l/n)$$

In this equation:

(x,y,z) are cartesian co-ordinates based on the axes shown in FIGS. 3 and 4;

$f_0$ is an imaginary focal length equal to the distance along Ox between the origin O and the axial center of the filament 100, reference $F_0$;

l is the half-length of the filament;

r is the radius of the filament; and n is a real positive parameter chosen to lie in the range $1\leq n\leq+\infty$.

Figure 5:
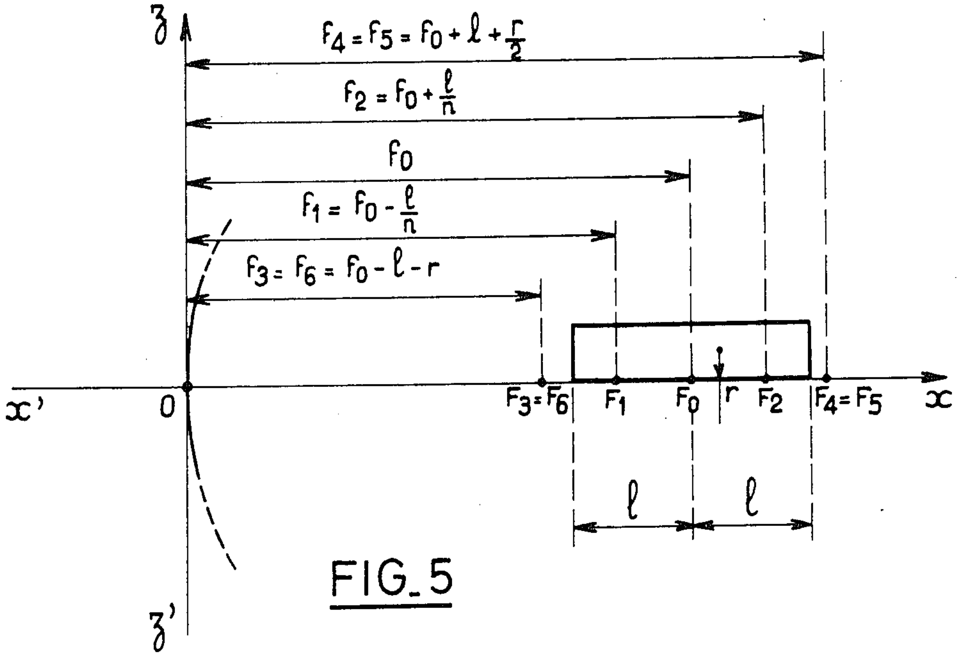
FIG. 5 is a longitudinal vertical section on a larger scale through a detail of the headlight shown in FIGS. 3 and 4.

In this paraboloidal type of equation, it will be understood that the zone 201 which differs from the zone 202, inter alia by $y>0$, has a focal length $f_1=f_0+l/n$, and that the zone 202 has a focal length $f_2=f_0-l/n$, which focal lengths correspond respectively to the focuses $F_1$ and $F_2$ shown in FIGS. 3 and 5. $f_0$ is thus the average of the focal lengths of the respective sectors 201 and 202.

In this way, it will be understood that the images of the filament 100 are offset to the right both by the sector 201 and by the sector 202, thereby beginning the inclined cutoff along Hc, as shown in FIG. 6. In this respect, and given that such an offset is a function of the parameter n, the value of this parameter is chosen in such a manner as to ensure that the bright spot determined in this way lies substantially over the point "75R" of the European regulations.

The zones 203 and 204 are determined by the following equation:

$$x=y^2/4f_h+z^2/4f_hP \quad (2)$$

where $$P=(4f_hf_v+y^2)/(4f_h^2+y^2)$$

$$f_h=f_0+(y/|y|)(l/n), \text{ and}$$

$$f_v=f_0-(z/|z|)(l+(r/2)+(r/4)(1+z/|z|))$$

with the same constants, parameters, and variables as above.

Figure 7:
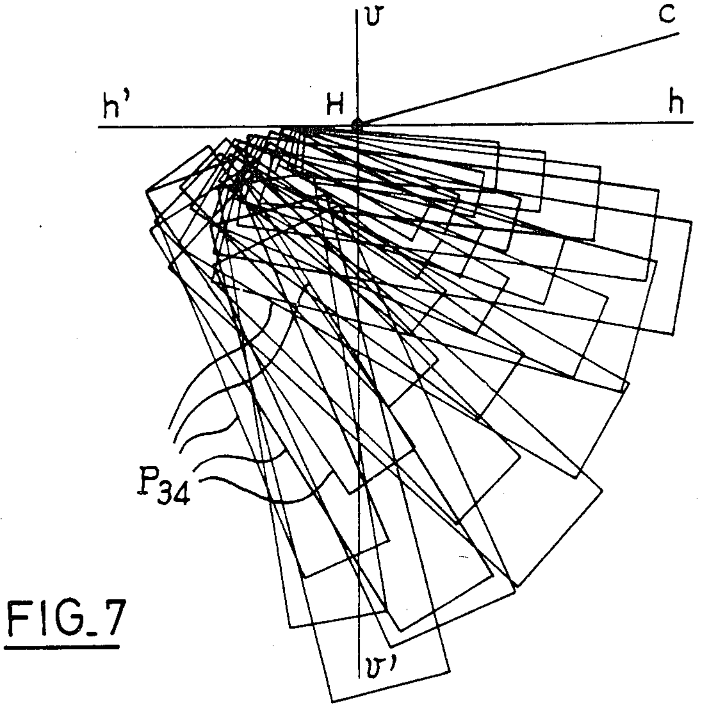

The images $P_{34}$ of the filament 100 generates by these zones and shown in FIG. 7 serve mostly to determine the left-hand horizontal cutoff of the beam.

The zones 205 and 206 in the presently-preferred embodiment of the invention satisfy the equation:

$$x=y''^2/4f_h+z''^2/4f_hQ \quad (3)$$

where $$y''=y\cos\alpha+z\sin\alpha$$

$$z''=z\cos\alpha-y\sin\alpha$$

$$Q=(4f_hf_v+y''^2)/(4f_h^2+y''^2)$$

$$f_h=f_0+(y''/|y''|)(l/n), \text{ and}$$

$$f_v=f_0-(z''/|z''|)(l+(r/2)+(r/4)(1+z''/|z''|))$$

with the same constants, parameters, and variables as above, and the angle $\alpha$ having a value of 15° in the present example, i.e. the angle between the half plane Hc of the right-hand cutoff relative to the horizontal h'-h.

It may be observed that equation (3) is derived from above-specified equation (2) by a co-ordinate change corresponding to a rotation through the angle $\alpha$ about the axis Ox. This rotation serves, in particular, to ensure second order continuity with the paraboloidal surfaces 201 and 202 at the half planes xOs' and xOs which are inclined at the angle $\alpha$, with these two half planes being defined by the equation:

$$z/y=\tan(\alpha), \text{ i.e. } z\cos\alpha-y\sin\alpha=0 \text{ or } z''=0$$

Figure 8:
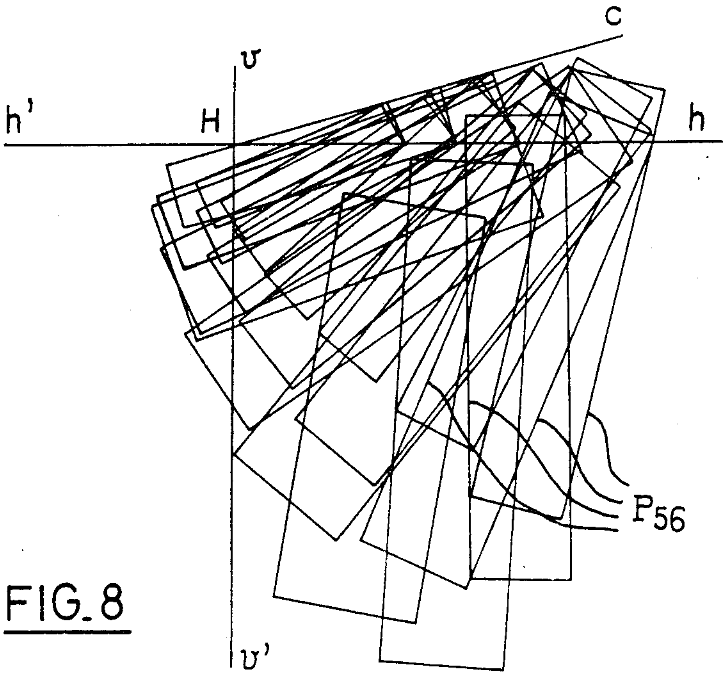

The images $P_{56}$ of the reflecting surfaces 205 and 206 as shown in FIG. 8 serve mostly to define the inclined cutoff Hc of the right-hand portion of the beam by extending the cutoff which is begun—at the bright spot by the zones 201 and 202.

It may be shown by calculation which need not be reproduced here that the surfaces of the six zones 201 and 206 present second order continuity at their transitions, except for the transitions at the half planes xOt' and xOt where a slight defect in second order continuity is observed in theory, as shown below.

As for first order continuity of the surfaces, it will be verified below that the various surfaces 201 to 206 present identical sections in pairs on the planes where they meet one another. The verification of second order continuity is much more complicated and will be omitted.

More precisely, and as already mentioned, the surface 201 is a paraboloid having a focal length $f_1=f_0-l/n$. The sections of this surface in the half planes xOy' and xOs' are thus parabolas having the same focal length $f_1=f_0-l/n$. By identical reasoning it can be shown that the sections of the surface 202 in its limiting half planes xOy and xOs are parabolas having the same focal length $f_2=f_0+l/n$.

As for the section of the zone 203 in the half plane xOy' (which half plane is mathematically defined by $y<0$ and $z=0$, equation (2) determining said surface reduces to:

$$x=y^2/(4f_h)$$

where $f_h=f_0+(-1)(l/n)$, giving a parabola of focal length $f_0-l/n=f_1$ which provides continuity with the surface 201.

Similarly, it can be shown that the section of the surface 204 on the half plane xOy ($y>0$, $z=0$) is a parabola having a focal length $f_0+l/n=f_2$. Continuity is obtained again.

The connection between the surfaces 201 and 205 takes place in the half plane xOs', whose equation is $z''=0$, $y''<0$. Equation (3) thus reduces to $$x=y''^2/4f_h$$

where $f_h=f_0+(-1)(l/n)$, i.e. a parabola having a focal length of $f_0-l/n=f_1$.

Finally, the connection between the surfaces 202 and 206 takes place in the half plane xOs, whose equation is $z''=0$, $y''>0$, and equation (3) reduces to $$x=y''^2/4f_h$$

where $f_h=f_0+(+1)(l/n)$, i.e. a parabola having a focal length of $f_0+l/n=f_2$.

In these last two cases continuity (at least to first order) has thus been demonstrated.

The characteristics of the connections between the surfaces 203 and 206 in the half plane xOt and the surfaces 204 and 205 in the half plane xOt' must now be considered.

To a first approximation, we begin by determining the equations of notional sections where the surfaces 203 and 204 would intersect the vertical plane, supposing that said surfaces extended as far as the vertical plane.

The top vertical half plane xOz is determined by $y=0$ and $z>0$. Equation (2) thus reduces to $$x=z^2/4f_hP=z^2/4f_v \text{ since P reduces to } 4f_hf_v/4f_h2$$

where $$f_v=f_0-(+1)(l+(r/2)+(r/4)(1+(+1)))$$

$$=f_0-l-r$$

The notional section where the surface 203 would intersect the top vertical plane is thus a parabola of focal length $f_3=f_0-l-r$ which corresponds to a focus $F_3$ whose position behind the filament 100 is shown in FIG. 5.

The same procedure is applied to determining the notional section where the surface 206 would intersect the plane xOu which is perpendicular to the plane xOs, supposing said surface 206 were extended beyond its limiting plane xOt. The equation of the top half plane xOu is $y''=0$, $z''>0$. Equation (3) then reduces to $$x=z''^2/4f_v$$

where $$f_v=f_0-(+1)(l+(r/2)+(r/4)(1+(+1)))$$

$$=f_0-l-r$$

giving a parabola of focal length $f_6=f_0-l-r$, i.e. the same as $f_3$ (see FIG. 5).

Thus, and by virtue of the symmetry which exists between the surfaces 203 and 206 about the plane xOt determining the transition between said surfaces, it can be affirmed that said surfaces have the same section in said transition plane and that this section is relatively close to a parabola having a focal length $f_3=f_6=f_0-l-r$ like the sections on either side of the connection.

It is observed that in theory second order continuity is not achieved locally, and that there is a very slight kink at the connection half plane xOt.

However, in practice, this defect is attenuated to such an extent in the machining and polishing steps applied to the reflector or to its mold as to cause the defect to disappear and to give rise to no apparent defect in the projected beam.

In similar manner, the notional section between the surface 204 as extended beyond the connection half plane xOt' to the bottom vertical half plane xOz' whose equation is $y=0$, and $z<0$, is given by equation (2), i.e.

$$x=z^2/4f_v$$

where $$f_v=f_0-(-1)(l+(r/2)+(r/4)(1+(-1)))$$

$$=f_0+l+r/2$$

It can be seen that this notional section is in the form of a parabola having a focal length $f_4=f_0+l+r/2$ which corresponds to a focus $F_4$ whose position ahead of the filament is shown in FIG. 5.

Similarly, the notional section of the surface 205 of equation (3) as extended to the bottom half plane xOu' whose equation is $y''=0$, $z''<0$, is given by $$x=z''^2/4f_v$$

where $$f_v=f_0-(-1)(l+(r/2)+(r/4)(1+(-1)))$$

$$=f_0+l+r/2$$

giving a parabola of focal length $f_5=f_0+l+r/2=f_4$.

Using the same argument as above, the surfaces 204 and 205 have the same sections in the connection half plane xOt' and this section is fairly close to a parabola of focal length $f_4=f_5=f_0+l+r/2$, with the corresponding focuses $F_4=F_5$ (see FIG. 5) representing two notional sections of the connected surfaces, each existing at a small angular distance on a respective side of the actual connection therebetween.

Suitable numerical values for the variables and constants in equations (1) to (3) are given below, with these values being particularly well suited for use in a dipped headlight using an H1A type lamp:

$l=2.75$ mm
$r=0.6$ mm
$f_0=22.5$ mm and
$n=1.375$.

These values give rise to the following focal lengths:

$f_1=20.5$ mm for the paraboloid 201;
$f_2=24.5$ mm for the paraboloid 202;
$f_3=f_6=$ about 19.15 mm for the transition pseudoparabola between zones 203 and 206; and
$f_4=f_5=$ about 25.55 mm for the transition pseudoparabola between zones 204 and 205.

Naturally, such a reflector is used with a glass for improving beam spreading, and in particular for spreading the beam horizontally. Preferably, the zones of the glass which correspond to the sectors 201 and 202 of the reflector which provide the major contribution to creating and accurately positioning the bright spot are smooth or disposed to deflect only slightly. However, in any event, the glass 300 closing the headlight is designed so as to perform substantially no vertical deflection so as to avoid degrading the satisfactory cutoff obtained by the special design of the reflector, and in particular so as to avoid increasing dazzle illumination at standardized point B50 (see FIG. 1).

Naturally, the present invention is not limited to the specific embodiment described above, but extends to any variant thereof within the scope of the claims. In particular, surfaces other than those defined by equations (2) and (3) could be determined for providing continuous transition between the surfaces 201 and 202 while ensuring that the images of the filament are below the cutoff.

Finally, the above description is given for a traffic driven on the right-hand side of the road. Naturally, for traffic driven on the left-hand side, the person skilled in the art will perform the appropriate symmetrical changes about the vertical plane.

I claim:

1. A dipped headlight for a motor vehicle, comprising:

a reflector including two sectors in the form of paraboloids of revolution about a common axis, said sectors being disposed symmetrically about said axis and being delimited by two axial planes, one of which planes is horizontal and the other of which planes is at a small angle to said horizontal plane equal to the lift angle ($\alpha$) of the dipped beam cutoff;

a lamp having an axial filament emitting freely in all directions which is upwardly offset in a radial direction so that its emitting surface is essentially tangential to said axis; and a light-spreading glass placed in front of the reflector and having non-deflecting or substantially non-deflecting zones corresponding to said two sectors in the form of paraboloids of revolution;

said headlight including the improvements whereby:

said two sectors in the form of paraboloids of revolution have different focal lengths, with their focuses being situated on the axis and respectively ahead of and behind the center of the filament; whereby said sectors generate a bright spot which defines said cutoff and is laterally offset; and said reflector further includes reflecting surfaces extending beyond said axial planes and interconnecting, without discontinuity, said two paraboloidal sectors having different focuses, said reflecting surfaces forming images of the filament below said cutoff.

2. A dipped headlight according to claim 1, wherein the focuses of said two paraboloidal sectors are disposed at equal distances in an axial direction on opposite sides of the center of said filament.

3. A dipped headlight according to claim 2, wherein the focuses of said two paraboloidal sectors are disposed in an axial direction on either side from the center of said filament at a distance which is less than one-half of the length ($2l$) of the filament.

4. A dipped headlight according to claim 3, wherein said two paraboloidal sectors are defined by the equation:

$$x=y^2/4f_h+z^2/4f_h \quad (1)$$

where $f_h=f_0+(y/|y|)(l/n)$ and wherein said reflecting surfaces are defined by the equations:

$$x=y^2/4f_h+z^2/4f_hP \quad (2)$$

where $$P=(4f_hf_v+y^2)/(4f_h^2+y^2)$$

$$f_h=f_0+(y/|y|)(l/n), \text{ and}$$

$$f_v=f_0-(z/|z|)(l+(r/2)+(r/4)(1+z/|z|))$$

$$x=y''^2/4f_h+z''^2/4f_hQ \quad (3)$$

where $$y''=y\cos\alpha+z\sin\alpha$$

$$z''=z\cos\alpha-y\sin\alpha$$

$$Q=(4f_hf_v+y''^2)/(4f_h^2+y''^2)$$

$$f_h=f_0+(y''/|y''|)(l/n), \text{ and}$$

$$f_v=f_0-(z''/|z''|)(l+(r/2)+(r/4)(1+z''/|z''|))$$

and where:

$f_0$ is a notional focal length corresponding to a focus situated axially and level with the center of the filament;

l is the half-length of the filament;

r is the radius of the filament; and n is a constant chosen such that $1\leqq n\leqq+\infty$.

5. A dipped headlight according to claim 1, wherein said angle ($\alpha$) between said two axial planes delimiting said two paraboloidal sectors is about 15°.

6. A dipped headlight according to claim 1, wherein said filament is offset upwardly from said axis by a distance equal to the radius of said filament.

* * * * *